R. E. HELLMUND.
SYSTEM OF CONTROL.
APPLICATION FILED SEPT. 9, 1915.
1,291,507.
Patented Jan. 14, 1919.
6 SHEETS—SHEET 1.
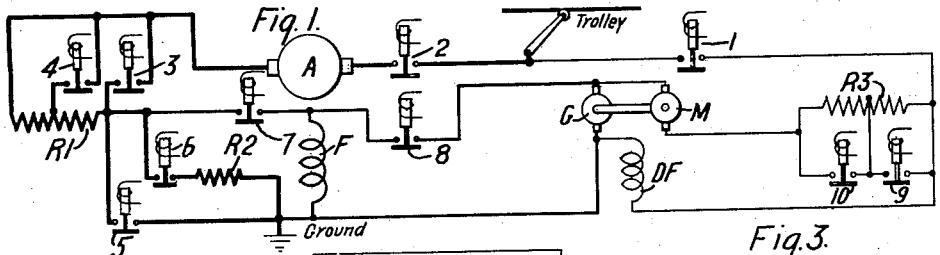
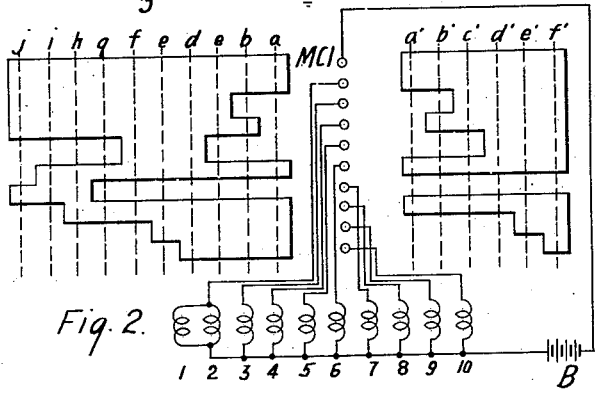
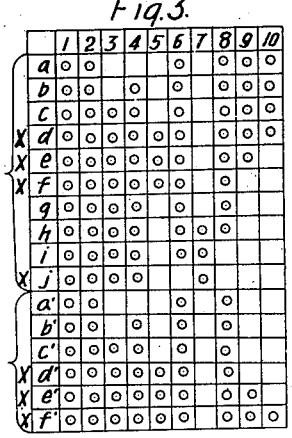
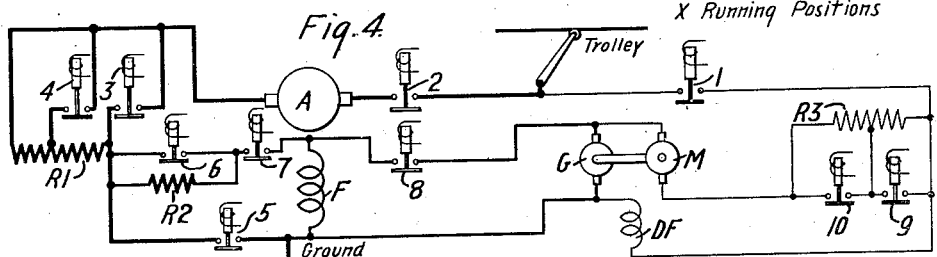
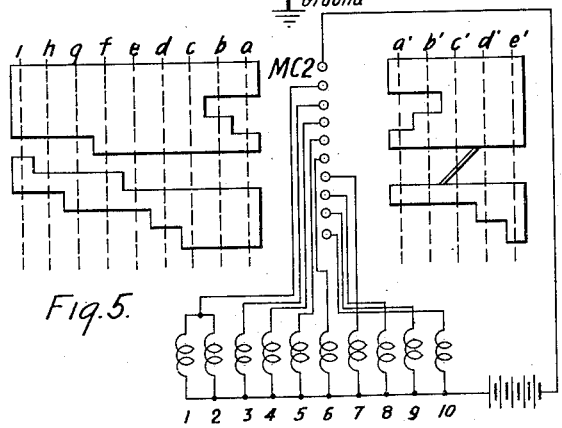
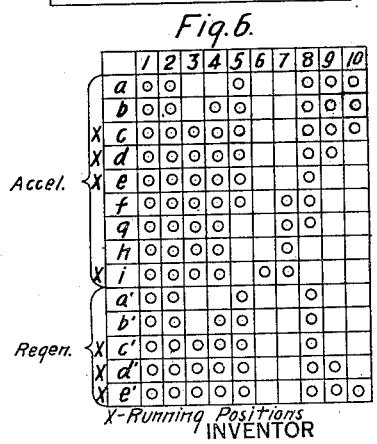
WITNESSES:
Fred. A. Lind
W. R. Coley
INVENTOR
Rudolf E. Hellmund
BY
Wesley G. Carr
ATTORNEY R. E. HELLMUND.
SYSTEM OF CONTROL.
APPLICATION FILED SEPT. 9, 1915.
1,291,507.
Patented Jan. 14, 1919.
6 SHEETS—SHEET 2.
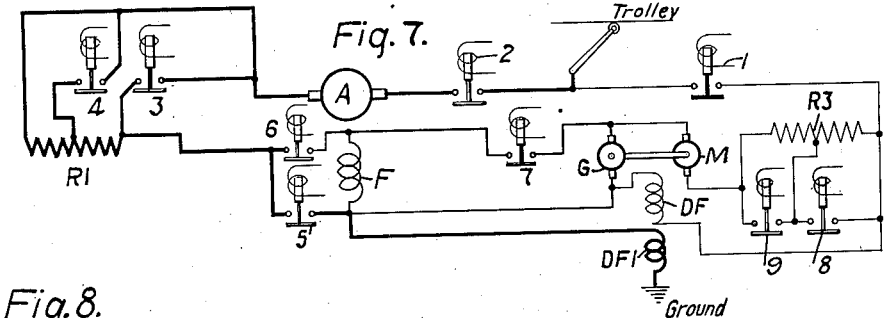
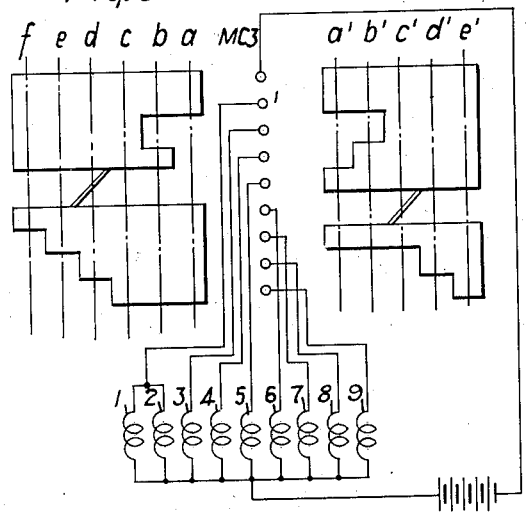
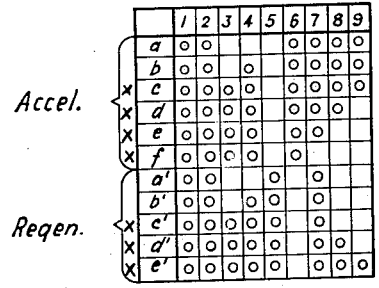
×Running positions.
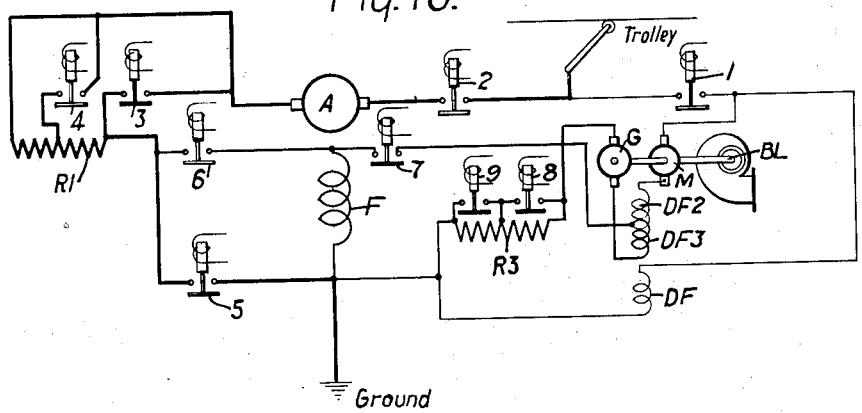
WITNESSES:
INVENTOR
Rudolf E. Hellmund.
BY
ATTORNEY R. E. HELLMUND.
SYSTEM OF CONTROL.
APPLICATION FILED SEPT. 9, 1915.
1,291,507.
Patented Jan. 14, 1919.
6 SHEETS—SHEET 3.
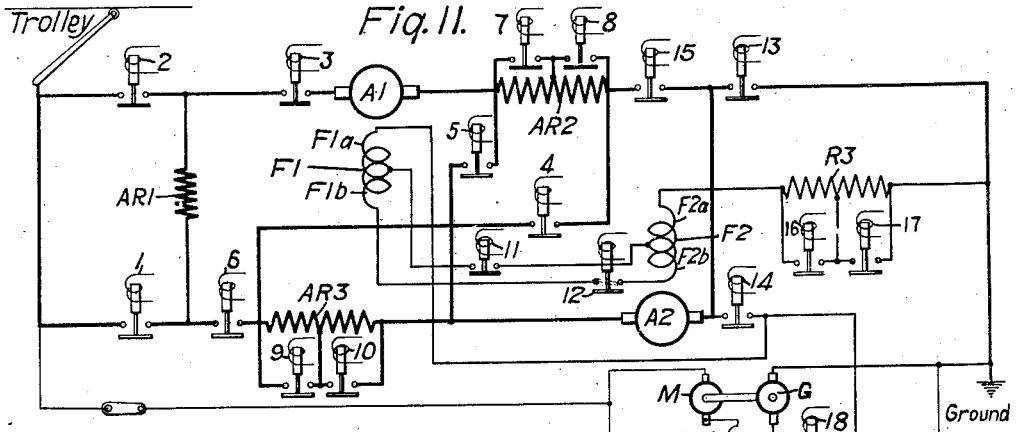
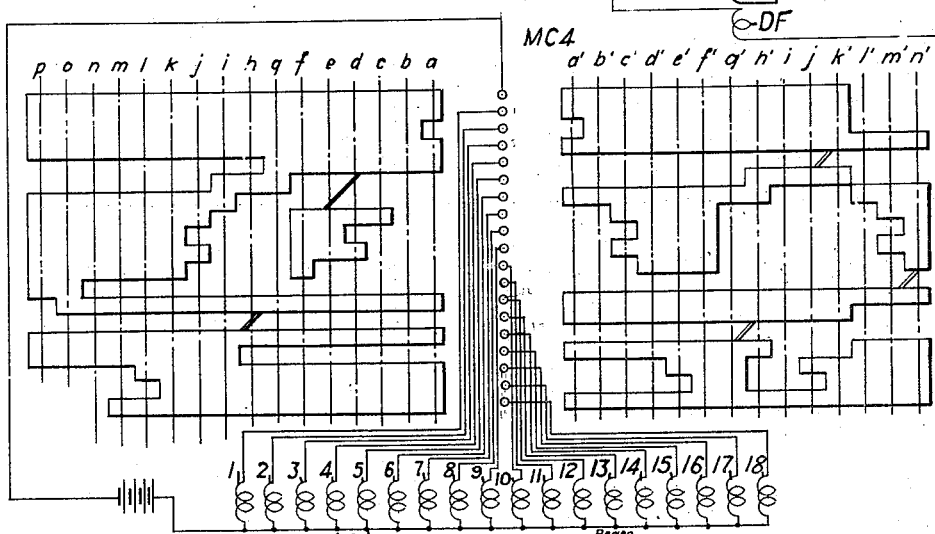
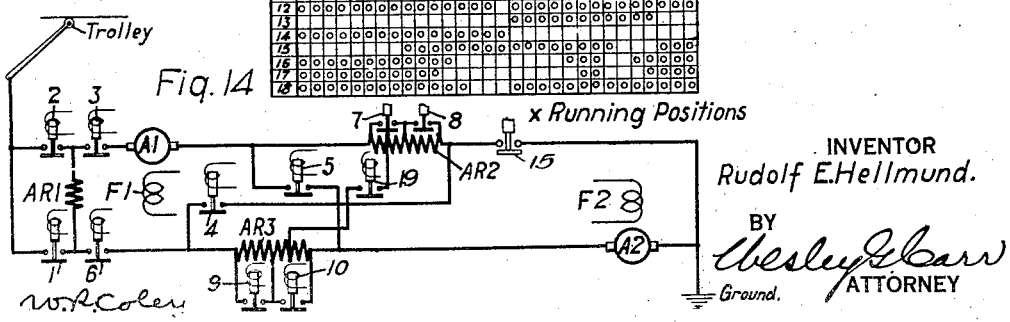
INVENTOR
Rudolf E. Hellmund.
BY
ATTORNEY

R. E. HELLMUND.
SYSTEM OF CONTROL.
APPLICATION FILED SEPT. 9, 1915.

1,291,507.

Patented Jan. 14, 1919.
6 SHEETS—SHEET 4.

WITNESSES:
Fred. A. Lind.
W. R. Coley

INVENTOR
Rudolf E. Hellmund
BY
Wesley G. Carr
ATTORNEY

R. E. HELLMUND.
SYSTEM OF CONTROL.
APPLICATION FILED SEPT. 9, 1915.

1,291,507.

Patented Jan. 14, 1919.
6 SHEETS—SHEET 5.

WITNESSES:
Fred. A. Lind.
W. R. Coley

INVENTOR
Rudolf E. Hellmund
BY
Besley & Carr
ATTORNEY

R. E. HELLMUND.
SYSTEM OF CONTROL.
APPLICATION FILED SEPT. 9, 1915.

1,291,507.

Patented Jan. 14, 1919.
6 SHEETS—SHEET 6.

WITNESSES:
Fred. A. Lind.
W. R. Coley

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,291,507.  Specification of Letters Patent.  Patented Jan. 14, 1919.

Application filed September 9, 1915. Serial No. 49,752.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems of Control, of which the following is a specification.

My invention relates to systems of control, and it has special reference to the control of electric motors for electric railway vehicles and the like that are adapted to be employed under conditions of acceleration and also of regeneration to the supply circuit.

One object of my invention is to provide a system of the above-indicated character which shall be effective and reliable in operation, which shall employ an auxiliary source of energy in conjunction with the supply-circuit energy during a portion of the machine-accelerating period, and which shall employ only the supply-circuit energy during the remaining portion thereof.

Another object of my invention is to provide a system of the class in question wherein a suitable auxiliary source of energy, such as a dynamotor, is employed for field-excitation purposes during a predetermined initial portion of the accelerating period, the machine being subsequently operated as a straight series motor, and wherein the dynamotor is employed during regeneration.

Figure 15:
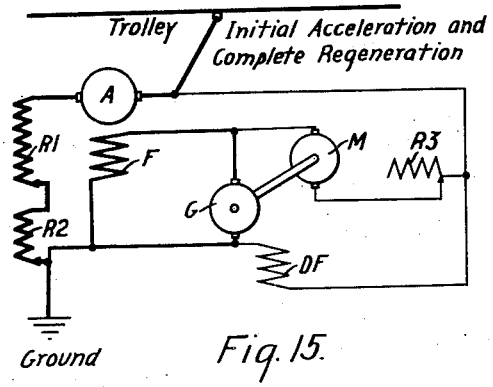
Figure 16:
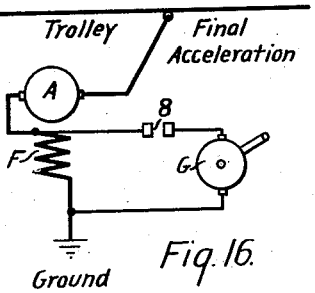
Figure 17:
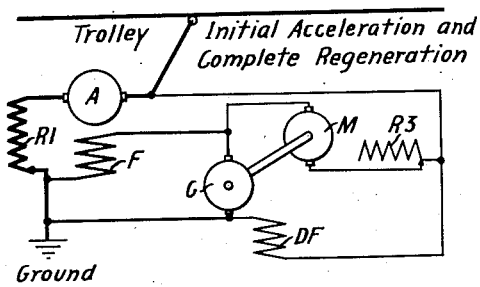
Figure 18:
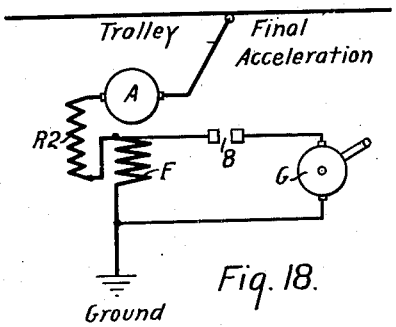
Figure 19:
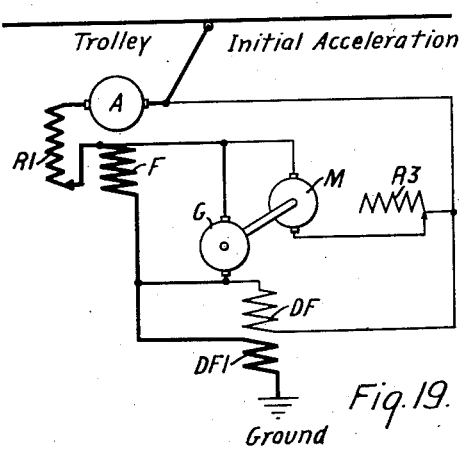
Figure 20:
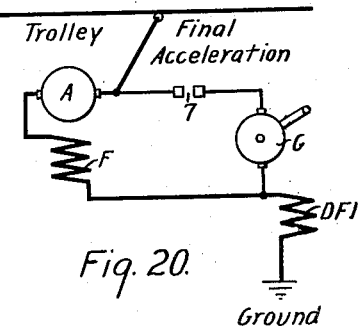
Figure 21:
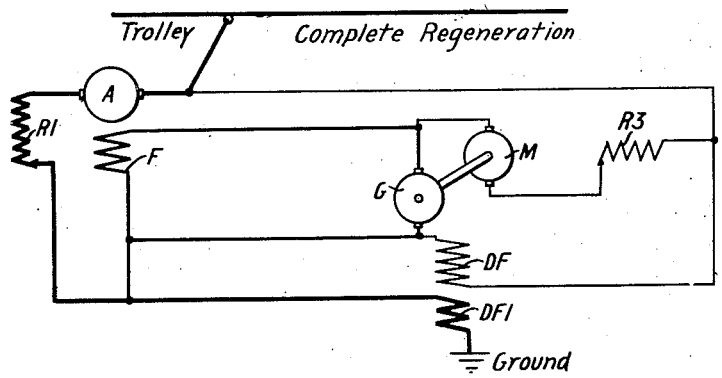
Figure 22:
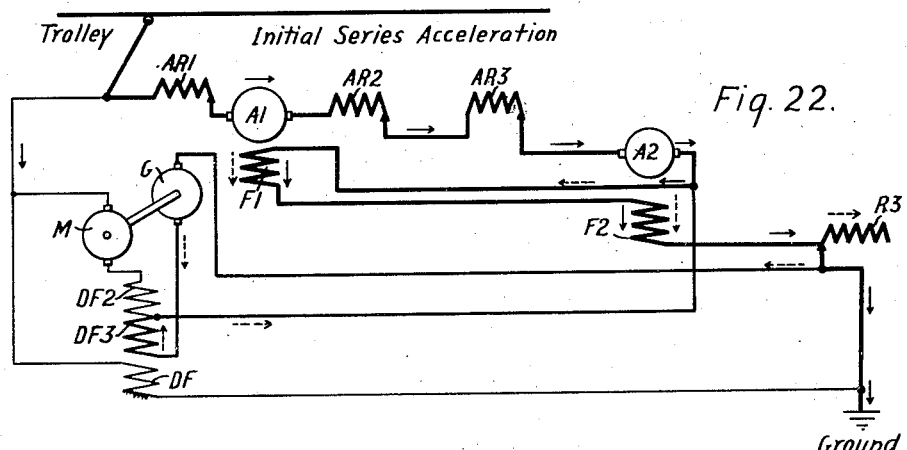
Figure 23:
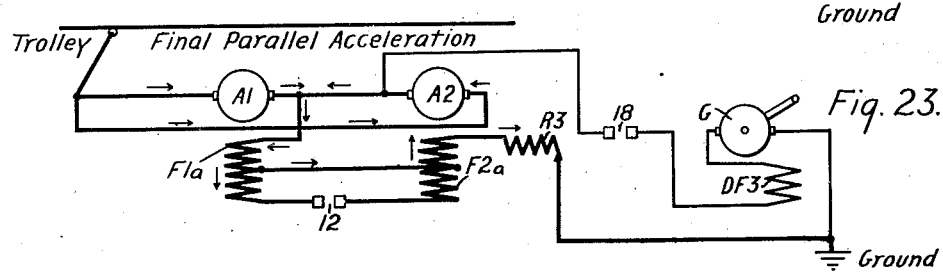
Figure 24:
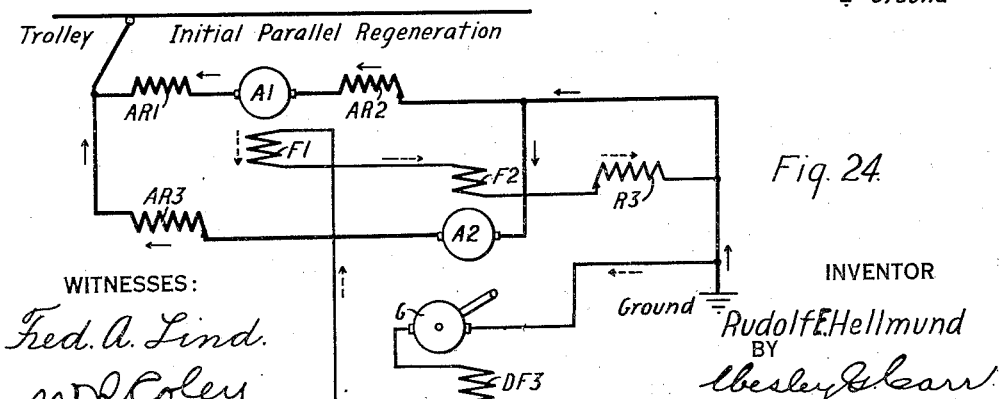
Figure 25:
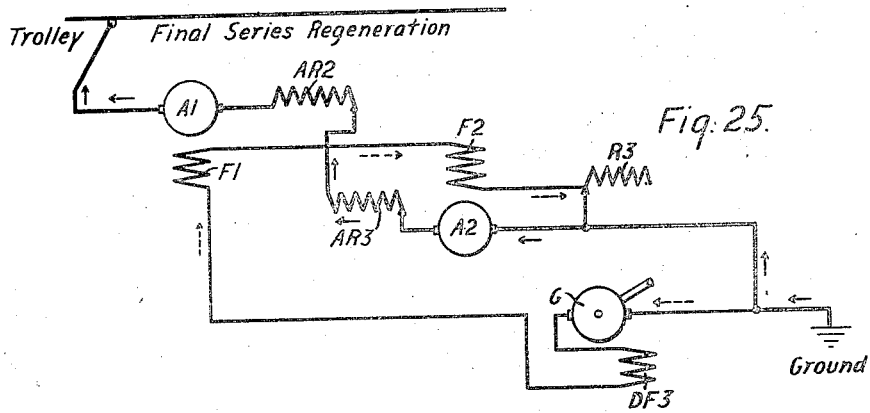
Figure 27:
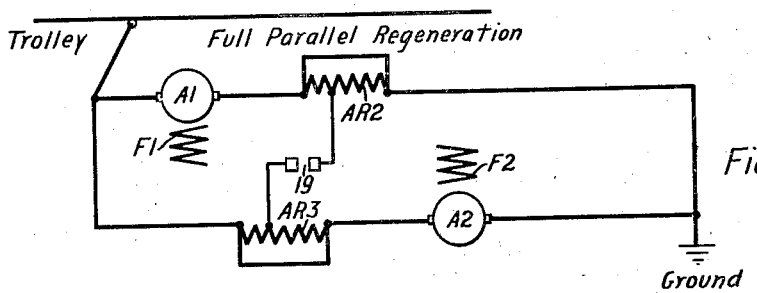
Figure 28:
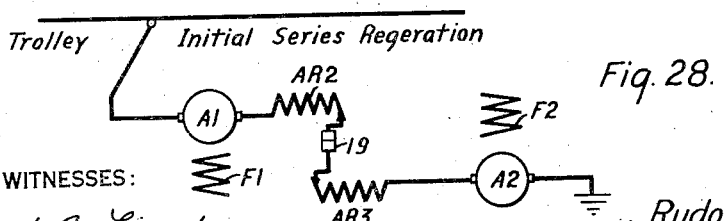

My invention may best be understood by reference to the accompanying drawing wherein Figure 1 is a diagrammatic view of the main circuits of a system of control embodying my invention; Fig. 2 is a diagrammatic view of an auxiliary governing system for manipulating the several motor-circuit switches that are shown in Fig. 1 in accordance with the sequence chart, of a well-known form, that is illustrated in Fig. 3; Fig. 4, Fig. 7, Fig. 10, Fig. 11 and Fig. 14 are diagrammatic views, corresponding to Fig. 1, of various modifications of my invention; Fig. 5, Fig. 8 and Fig. 12 are views, similar to Fig. 2, of systems that are respectively associated with the main systems that are shown in Fig. 4, Fig. 7, Fig. 10 and Fig. 11; Fig. 6, Fig. 9 and Fig. 13 are sequence charts that are to be employed with Fig. 4, Fig. 7 and Fig. 10, and Fig. 11, respectively; Fig. 15 and Fig. 16 are simplified views corresponding to Fig. 1 and respectively illustrating the circuits for initial acceleration and complete regeneration, and for final acceleration, as indicated by the accompanying legends; Figs. 17 and 18 are similar views corresponding to Fig. 4; Fig. 19, Fig. 20 and Fig. 21 illustrate in a simplified manner various circuit connections made in the system of Fig. 7, as indicated by the titles; Fig. 22 to Fig. 26, inclusive, serve a similar purpose with respect to Fig. 11; and Fig. 27 and Fig. 28 are simplified views allied to Fig. 14 and showing the "parallel-series transition" connections.

Referring to Fig. 1 of the drawings, the system shown comprises a plurality of suitable supply-circuit conductors respectively marked Trolley and Ground, a main dynamo-electric machine comprising an armature A and a series-type field magnet winding F, an auxiliary source of energy comprising a dynamotor of well-known form that is provided with a plurality of mechanically associated armature windings M and G and a common field-magnet winding DF, a plurality of main-circuit resistors R1 and R2 that are respectively adapted to be connected in series relation with the armature A under starting conditions, a third resistor R3 that is disposed in series relation with the auxiliary armature winding M, a plurality of motor-controlling switches 1, 2, 5, 6, 7 and 8, a plurality of suitable switches 3 and 4 for respectively short-circuiting sections of the resistor R1, and a plurality of switches 9 and 10 for respectively short-circuiting sections of the resistors R3. The two auxiliary armature windings M and G are thus connected in series relation with the resistor R3 across the supply circuit, and the armature winding G is adapted to be connected through the switch 8 in parallel relation to the main field winding F.

The auxiliary governing system shown in Fig. 2 comprises the actuating coils for the various switches that are illustrated in Fig. 1, a suitable master controller MC1 that is adapted to occupy a plurality of operative positions *a* to *j*, inclusive, when actuated in one direction that corresponds to acceleration and is adapted to occupy a plurality of operative positions *a'* to *f'*, inclusive, when operated in the reversed direction that corresponds to regenerative operation, and a suitable source of energy, such as a battery B, for energizing the various actuating coils through the master controller MC1 in accordance with the sequence chart that is shown in Fig. 3.

The auxiliary governing system that is illustrated in Fig. 2 is familiar to those skilled in the art, and the operation thereof is believed to be sufficiently well-known to obviate the necessity of detailed description here. The particular governing system employed is immaterial to my present invention and any other suitable type, such as that employing a controller including main-circuit coöperating contact segments and control fingers, may be utilized if desired. The customary main-circuit reversing switch for reversing the electrical relations of the armature A and the field winding F, and the governing connections of the switch have been omitted from Fig. 1 and Fig. 2, respectively, for the sake of simplicity and clearness. However it will be understood that such a reversing switch is normally employed in all of the systems that are illustrated.

Assuming that it is desired to effect acceleration of the main machine and that the master controller MC1 has been moved to its initial operative position $a$, the operation of the system, explained in connection with the sequence chart of Fig. 3 and with Fig. 15, may be set forth as follows: The switches 1, 2, 6, 8, 9 and 10 are initially closed, whereby the dynamotor is started into operation upon the closure of the switch 1, and the main dynamo-electric machine is connected in series-circuit relation with the resistor R1 and R2 across the supply circuit. The armature winding G delivers energy to the main field winding F by reason of the closure of the switch 8, and the dynamotor operates at its highest speed by reason of the complete short-circuit of the resistor R3.

When the master controller is moved to position $b$, the switch 4 is closed, thus short-circuiting a portion of the resistor R1. In position $c$, the switch 3 is closed, thereby completing the exclusion from circuit of the resistor. In position $d$, the switch 5 is closed to effect the short-circuit of the resistor R2.

In positions $e$ and $f$ of the master controller, the switches 10 and 9 are respectively opened, whereby the resistor R3 is gradually inserted into the circuit of the corresponding armature winding M to gradually decrease the speed of the dynamotor and respectively reduce the excitation of the main field winding F from the armature winding G. The weakening of the main field excitation effects a further increase in the speed of the main dynamo-electric machine, in accordance with familiar principles.

In position $g$, switch 5 is opened to again momentarily insert the resistor R2 in the main circuit, and, in position $h$, the switch 7 is closed to dispose the resistor R2 in parallel relation to the main field winding F and further decrease the current traversing that winding. In position $i$, the switch 8 is opened, whereby the armature winding G is disconnected from the main field winding F and the main machine operates as a straight series motor during the remainder of the accelerating period.

In position $j$, (see Fig. 16) the switch 6 is opened, whereby the armature A and the field winding F are directly connected to the supply circuit, and the excitation of the field winding F is still further decreased by reason of the reduction in the voltage that is impressed upon the terminals of the field winding when the resistor R2 is excluded from circuit. As indicated in Fig. 3 and in the other sequence charts, the several positions that are marked "X" are running positions of the main machine, while all other positions are either starting or transition positions.

Assuming that it is desired to effect regenerative operation of the system, the master controller MC1 may be moved to its initial regenerative position $a'$, whereupon switches 1, 2, 6 and 8 are closed to connect the main machine and the dynamotor to the supply circuit, with the armature winding G connected across the main field winding F and with the resistors R1, R2 and R3, all included in their respective circuits (see Fig. 15). Inasmuch as the entire resistor R3 is active, the dynamotor is operated at its lowest speed and, consequently, the energization of the main field winding F from the armature winding G is at its lowest value.

When the master controller is moved to positions $b'$ and $c'$, the switches 4 and 3 are respectively closed to gradually short-circuit the resistor R1, and, in position $e'$, the switch 5 is closed to exclude the resistor R2 from circuit, thus tending to maintain a desirably constant regenerated current as the speed of the main momentum-driven dynamo-electric machine decreases.

In positions $e'$ and $f'$, the switches 9 and 10 are respectively closed to gradually short-circuit the resistor R3 and correspondingly increase the dynamotor speed and the excitation of the main field winding F.

Reference may now be had to Fig. 4, wherein the only difference from the system shown in Fig. 1 resides in the disposition of the resistor R2, and the switch 6 in parallel-circuit relation intermediate the resistor R1 and the switch 7.

The master controller MC2, that is shown for illustrative purposes only in Fig. 5, is adapted to occupy positions $a$ to $i$, inclusive, corresponding to acceleration, and positions $a'$ to $e'$, inclusive, corresponding to regeneration of the main dynamo-electric machine.

Assuming that it is desired to effect acceleration of the main machine, the master controller may be moved to its initial accelerating position $a$, whereby switches 1, 2, 5, 8, 9 and 10 are closed (see Fig. 17). The dynamotor is thus connected across the supply circuit, and its armature winding G is connected to energize the main field winding F, while the main dynamo-electric machine is connected through the resistors R1 and R2 to the supply circuit.

In positions $b$ and $c$ of the master controller, switches 4 and 3 are successively closed to gradually short-circuit the resistor R1, while in positions $d$ and $e$ the switches 10 and 9 are respectively opened to decrease the dynamotor speed for the purpose already set forth. In position $f$, the switch 7 is closed, whereby the resistor R2 is connected in parallel relation to the main field winding F, and, in position $g$, the switch 5 is opened to temporarily dispose the resistor R2 in series relation with the field winding F. In position $h$, the switch 8 is opened, whereby the main dynamo-electric machine is subsequently operated as a straight series motor, and, in position $i$, the switch 6 is closed to finally short-circuit the resistor R2 (see Fig. 18).

For regenerative operation, the master controller MC2 may be moved to its position $a'$, whereby switches 1, 2, 5 and 8 are closed to connect the dynamotor, running at its lowest speed, to the supply circuit and to connect the main dynamo-electric machine in series relation with the resistors R1 and R2 across the supply circuit (see Fig. 17).

In positions $b'$ and $c'$, switches 4 and 3 are respectively closed to gradually short-circuit the resistor R1, while, in positions $d'$ and $e'$, the switches 9 and 10 are successively closed to gradually exclude the resistor R3 from the dynamotor circuit to effect an increase in the dynamotor speed and a consequent increase of the main field winding excitation as the speed of the main machine decreases.

The system of main-circuit connections that is illustrated in Fig. 7 differs from the system shown in Fig. 4 by the omission of the resistor R2 and by the provision of a dynamotor field winding DF1 that is connected in series relation with the main armature A and is differentially disposed with respect to the shunt field winding DF of the dynamotor, for a purpose to be described.

The auxiliary governing system that is shown in Fig. 8 includes a suitable master controller MC3 that is adapted to occupy positions $a$ to $f$, inclusive, corresponding to acceleration, and $a'$ to $e'$, inclusive, corresponding to regeneration, of the main machine that is illustrated in Fig. 7.

To effect acceleration of the machine, the master controller MC3 may be moved to its initial position $a$, whereby the switches 1, 2, 6, 7, 8 and 9 are closed, the dynamotor is started into operation at its highest speed, and the main dynamo-electric machine is connected through the resistor R1 to the supply circuit (see Fig. 19).

In positions $b$ and $c$, the switches 4 and 3 are respectively closed to gradually short-circuit the resistor R1, while, in positions $d$ and $e$, the switches 9 and 8 are successively opened to gradually decrease the dynamotor speed, as already set forth, and, in position $f$, the switch 7 is opened to exclude the auxiliary armature winding G from the main machine circuit (see Fig. 20).

It will be observed that, in the system just described, the omission of the resistor R2 permits the use of one less switch in the system, the operation being otherwise similar to those already described.

For regenerative operation, the master controller is moved into its position $a'$, whereby switches 1, 2, 5 and 7 are closed to connect the main machine to the supply circuit through the resistor R1, with the dynamotor operating at its lowest speed and adapted to energize the main field winding F (see Fig. 21).

In positions $b'$ and $c'$ of the master controller, switches 4 and 3 are respectively closed to short-circuit the resistor R1 as the main machine speed decreases. In positions $d'$ and $e'$, the switches 8 and 9 are successively closed to gradually short-circuit the resistor R3 and correspondingly increase the dynamotor speed, as hereinbefore set forth.

It will be observed that, inasmuch as the field windings DF and DF1 of the dynamotor are differentially disposed with respect to each other, if the regenerated current traversing the main armature A and the field winding DF1 should momentarily increase, the effective excitation of the dynamotor would be proportionately decreased, to speed up the dynamotor and thus increase the excitation of the main field winding. A converse action will, of course, take place in case the regenerated current tends to decrease, whereby a substantially constant regenerated current is maintained during the regenerating period. Such differential disposition of the dynamotor field windings is not of my present invention, but is fully shown and described in my copending application, Serial No. 855,539 filed Aug. 7, 1914.

In case a compressor or blower is driven by the dynamotor in accordance with a familiar practice, it is preferable to modify the main-circuit connections, in the manner shown in Fig. 10, to properly compensate for the additional load that is imposed upon the dynamotor and for the intermittent connection and disconnection thereof.

In Fig. 10, the system shown comprises the supply-circuit conductors Trolley and Ground, the main dynamo-electric machine having the armature A and the field winding F, the auxiliary armature windings M and G of the dynamotor, the resistors R1 and R3 and the switches 1 to 9, inclusive, that are connected in a similar manner to those shown in Fig. 7.

An intermittent load, here shown as a blower BL, is associated with the shaft of the dynamotor to supply ventilating air to the main dynamo-electric machine or to other parts of the associated electric railway vehicle, (not shown) in accordance with familiar practice. A multi-part field winding, having series-connected sections DF2 and DF3, is connected intermediate the armature windings M and G, and substantially its midpoint, that is, the junction-point of the sections, is connected through the switch 7 to one terminal of the main field winding F, while the other terminal of the field winding is connected through the resistor R3 to one terminal of the armature winding G which is thus adapted to energize the field windings F and DF3 and the resistor R3. The shunt field winding DF of the dynamotor is connected directly to the supply-circuit conductors and is differentially disposed with respect to the field windings DF2 and DF3 for the purpose set forth in connection with Fig. 7.

The manipulation of the motor-circuit switches, during both acceleration and regeneration, is identical with that described in connection with the system shown in Fig. 7, and the operation of the system need be described here only in so far as the operation of the blower BL with respect to the dynamo is concerned.

It will be observed that, by connecting the resistor R3 in the circuit of the armature winding G rather than in the circuit of the armature winding M, the load changes, by reason of the intermittent connection and disconnection of the blower BL or other devices, will not materially affect the speed of the dynamotor. Moreover, the provision of the field winding sections DF2 and DF3, which are connected in series relation with the armature windings M and G, will impart a compound characteristic to the dynamotor rather than a shunt characteristic, as in the systems already described.

Such a characteristic will tend to improve the commutating conditions of the dynamotor, particularly with regard to the prevention of flash-over troubles, by reason of the relatively rapid building-up of the field flux of the field windings DF2 and DF3 upon the resumption of supply-circuit voltage after a temporary interruption thereof, inasmuch as the relatively low self-induction of the armature windings M and G will permit the traversal of an instantaneous relatively heavy current through the field windings DF2 and DF3 to prevent excessive distortion of the field flux by the rapidly built-up armature flux, which, as is well-known, tends to produce flash-over conditions in a machine.

Reference may now be had to Fig. 11, wherein the series-parallel system shown comprises the supply-circuit conductors Trolley and Ground, a plurality of main dynamo-electric machines respectively having armatures A1 and A2 and series-type multi-part field-magnet windings F1 and F2; an auxiliary dynamotor comprising the armature windings M and G and the field-magnet windings DF, DF2 and DF3, as illustrated in Fig. 10, a plurality of accelerating resistors AR1, AR2 and AR3, and a plurality of main-circuit switches 1 to 18, inclusive.

The field-magnet winding F1 comprises a plurality of series-connected sections F1$^a$ and F1$^b$, and the field winding F2 is similarly divided into sections F2$^a$ and F2$^b$ for purpose of field control, as hereinafter more fully set forth. The armature winding M, the field windings DF2 and DF3 and the armature winding G of the dynamotor are connected in series relation across the supply circuit, while the armature winding G is connected through the field winding DF3 and the resistor R3 across the series-connected main field windings F1 and F2.

The auxiliary governing system that is shown in Fig. 12 include a master controller MC4 that is adapted to occupy a plurality of operative positions $a$ to $p$, inclusive, corresponding to series-parallel acceleration of the main dynamo-electric machines, and a plurality of positions $a'$ to $n'$, inclusive, corresponding to parallel-series regenerative operation of the machines.

To effect acceleration of the main machines, the master controller MC4 may be moved to its initial position $a$, whereby switches 1, 3, 4, 12, 14, 16, 17 and 18 are closed, thus connecting the main dynamo-electric machines in series relation with all of the accelerating resistors across the supply circuit, the entire field windings F1 and F2 being utilized. The armature winding G is connected to further energize the main field windings, the resistor R3 being entirely short-circuited, whereby a relatively strong excitation is imparted to the main field windings from the armature winding G (see Fig. 22).

In position $b$, the switch 2 is closed, thereby short-circuiting the resistor AR1 to effect a predetermined degree of acceleration of the main machines.

As the master controller is successively moved through its positions $c$, $d$, $e$ and $f$, the switches 7, 9, 8 and 10 are respectively closed to gradually short-circuit the resistors AR2 and AR3 and thus effect further acceleration of the main machines, which are thus at this time connected in full-series relation.

In positions $g$, $h$ and $i$, the familiar "bridging" transition of the dynamo-electric machine is effected, the switch 5 being initially closed to directly connect the armatures A1 and A2, and the switch 4 and the resistor-short-circuiting switches 7, 8, 9 and 10 being opened at substantially the same instant; switches 6 and 15 are then closed to complete the parallel relation of the two dynamo-electric machines, whereafter switch 5 is opened. The main machines are thus disposed in initial parallel-circuit relation, the resistors AR2 and AR3 being respectively disposed in circuit with the armatures A1 and A2.

Upon actuation of the master controller through positions $j$ and $k$, the switches 7 and 9 are first simultaneously closed and then the switches 8 and 10 are actuated to their closed positions, whereby the resistors are again completely short-circuited.

In positions $l$ and $m$, the switches 17 and 16 are respectively opened, whereby the resistor R3 is gradually inserted in the circuit of the generator-armature winding G to correspondingly decrease the excitation of the main field windings, and, as a result, accordingly increase the speed of the main machines, in accordance with familiar principles.

When the master controller reaches its position $n$, the switch 18 is opened to disconnect the armature winding G from the main dynamo-electric machine circuit, thereby further weakening the main-field excitation. In position $o$, the switch 11 is closed and, in the final position $p$, the switch 12 is opened, whereby the sections F1$^b$ and F2$^b$ of the main field windings are excluded from circuit to effect a further degree of acceleration of the main machine, as will be understood (see Fig. 23).

When it is desired to effect regenerative operation of the system, the master controller MC4 may be moved to its initial regenerative position $a'$, whereby switches 1, 3, 6, 12, 13, 15 and 18 are closed, the momentum-driven dynamo-electric machines being thus initially connected in parallel-circuit relation, with the resistors AR2 and AR3 disposed in the respective circuits of the main machines and with the resistor AR1 active. The entire main field windings F1 and F2 are utilized, and the armature winding G is connected in circuit with the main field winding F1 and F2 as during acceleration, the main field windings, however, not receiving the main armature current by reason of the opening of the switch 14 and the closure of the switch 13 to directly connect the armature windings A1 and A2 to the negative conductor Ground (see Fig. 24).

In position $b'$, the switch 2 is closed to short-circuit the resistor AR1, and, in positions $c'$ and $d'$, the switches 7 and 9, and 8 and 10 are respectively closed in pairs to short-circuit the resistors AR2 and AR3 and thus compensate for the decrease in speed of the main dynamo-electric machines and to maintain a substantially constant regenerated current, as will be understood.

As the master controller is moved through its positions $e'$ and $f'$, the switches 16 and 17 are respectively closed to gradually short-circuit the resistor R3 and correspondingly increase the excitation of the main field windings from the armature winding G.

In positions $g'$, $h'$, and $i'$, the transition of the main machines from parallel to series relation without interrupting the flow of regenerated current is effected in the following manner: The resistor short-circuiting switches 7 to 10, inclusive, are first opened, the switches 16 and 17 are then opened, and the switch 5 is closed at substantially the same instant that the switches 6 and 15 are opened, whereby the motors are connected in circuit in a manner similar to that already described at the end of the series portion of acceleration (see Fig. 25).

Figure 26:
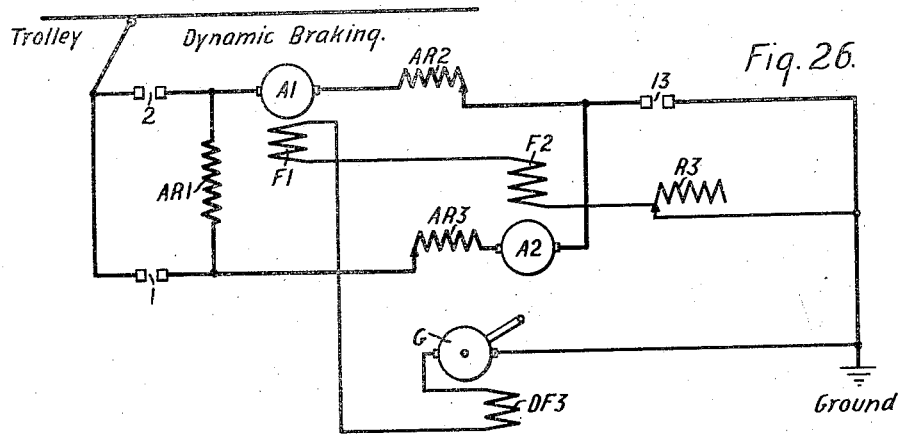

In position $j'$ and $k'$, the switches 16 and 17 are again closed for the purpose already described, whereupon the regenerative portion of the vehicle-braking period is terminated, and dynamic braking of the vehicle is next accomplished upon the actuation of the master controller through positions $l'$, $m'$ and $n'$, first by the opening of the switches 1, 2, 5 and 13 and the closure of the switches 6 and 15, whereby the main dynamo-electric machine armatures are connected in series relation with a local braking circuit comprising the resistors AR1, AR2 and AR3, and the switches 7 and 9, 8 and 10 are then successively closed in pairs to vary the dynamic braking action as the speed of the main machine decreases (see Fig. 26).

The main-circuit conections that are partially illustrated in Fig. 14 may be employed, if desired, for the specific purpose of reducing the flow of current upon the transition of the dynamo-electric machines from parallel to series relation during regenerative operation. It will be noted that a switch 19 is adapted to connect an intermediate point of the resistor AR2 to a corresponding intermediate point of the resistor AR3. The switch 19 is adapted to be closed just prior to the closure of switch 5, as described in connection with Fig. 11, whereby predetermined portions of the resistors AR2 and AR3 are connected in circuit directly between the main armatures A1 and A2 at the instant of their series connection, thus reducing to any desired degree, dependent upon the connections of the switch 19 to the resistors, the rush of current through the circuit of the main armatures (see Fig. 27 and Fig. 28). After the switch 19 has been closed, the switch 5 may be closed as already described and the switch 19 then opened, and the remainder of the operation may be as already set forth in conection with Fig. 11.

It will be understood that, whereas, in the systems described, a dynamotor has been mentioned as employed for purposes of auxiliary excitation, a motor-generator or other equivalent of the dynamotor may be utilized if desired.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. The method of operating a dynamo-electric machine as a motor and as a generator in conjunction with a supply circuit and an auxiliary source of energy, that consists in energizing the machine field winding by the two sources of energy during acceleration, and in energizing the field winding by one of said sources during regenerative operation of the machine.

2. The method of operating a dynamo-electric machine as a motor and as a generator in conjunction with a supply circuit and an auxiliary source of energy, that consists in energizing the machine field winding by the two sources of energy during a portion of the acceleration, in energizing the machine field winding by one of said sources during another portion of the acceleration and in energizing the field winding from one of said sources during regenerative operation of the machine.

3. The method of operating a dynamo-electric machine as a motor and as a generator in conjunction with a supply circuit and an auxiliary source of energy, that consists in energizing the machine field winding by the two sources of energy during a portion of the acceleration, in energizing the machine field winding from the supply circuit during another portion of the acceleration and in energizing the field winding from the auxiliary source of energy during regenerative operation of the machine.

4. In a system of regenerative control, the combination with a plurality of dynamo-electric machines, of means for operating the machines in parallel and in series circuit relation and for effecting parallel-series transition, and means comprising a resistor in the machine circuit for transmitting the machine current prior to the establishment of the series connection.

5. The method of effecting transition of a plurality of regenerating dynamo-electric machines from parallel to series-circuit relation, that consists in connecting translating devices in series with the machines, in establishing a cross connection between intermediate points of the parallel machine circuits and connecting the machines in series relation, and in excluding said translating devices from the circuit of the machines.

6. In a system of control, the combination with a supply circuit and a dynamo-electric machine having an armature and a field-magnet winding, of an auxiliary source of energy, means for employing supply-circuit energy for partially energizing the machine during the initial portion of the accelerating period, a translating device connected in series relation with said armature, means for gradually excluding said translating device from circuit and means for connecting said auxiliary source to said field winding during said initial portion of the accelerating period, means for subsequently weakening the field excitation, and means for excluding said auxiliary source from circuit during the remainder of said period.

7. In a system of control, the combination with a main dynamo-electric machine having an armature and a field-magnet winding, and a supply-circuit therefor, of a plurality of mechanically associated auxiliary armature windings, a plurality of translating devices, means for initially connecting one of said auxiliary armature windings through a short-circuited translating device to said supply circuit to derive motive energy therefrom, means for connecting the other auxiliary winding across said field winding during the initial portion of the accelerating period of said machine from the supply circuit, means for initially connecting a second translating device in series relation with the main armature, means for gradually short-circuiting said second translating device and means for subsequently gradually inserting said first translating levice into the circuit of the corresponding auxiliary armature winding during said initial portion of the accelerating period, and means for excluding said auxiliary source from circuit during the remainder of said period.

8. In a system of control, the combination with a main dynamo-electric machine having an armature and a field-magnet winding, and a supply circuit therefor, of a plurality of mechanically associated auxiliary armature windings, an auxiliary field winding connecting the auxiliary armature windings, a plurality of translating devices, means for initially connecting one of said auxiliary armature windings through a short-circuited translating device and a portion of said auxiliary field winding across said main field winding, means for connecting the auxiliary armature-winding circuit to the supply circuit, means for initially connecting a second translating device in series relation with the main armature, means for gradually short-circuiting said second device after the machine is started into operation, means for subsequently gradually inserting said first translating device into the circuit of the corresponding auxiliary armature winding, and means for finally excluding said auxiliary source from circuit.

9. In a parallel-series regenerative system of control, the combination with a plurality of main dynamo-electric machines severally having armatures and field-magnet windings, and a supply circuit therefor, of a plurality of mechanically associated auxiliary armature windings, a plurality of translating devices, means for connecting one of said auxiliary armature windings through one of said translating devices to energize the main field windings, means for connecting certain of said translating devices in the respective circuits of the parallel-related main armatures during the initial regenerating period, means for inserting a predetermined portion of said certain translating devices in series relation with the main armatures during the parallel-series transition thereof, and means for manipulating the several translating devices to regulate the entire regenerative operation.

10. In a system of control, the combination with a supply circuit and a dynamo-electric machine having an armature and a field-magnet winding, of an auxiliary source of energy, means for employing said auxiliary source in conjunction with the supply circuit energy during a portion of the machine-accelerating period, means for employing only one of the sources of energy during another portion of the accelerating period, and means for employing said auxiliary source to vary the main field winding excitation throughout regenerative operation.

11. In a system of control, the combination with a supply circuit and a dynamo-electric machine having an armature and a field-magnet winding, of an auxiliary source of energy, means for employing supply-circuit energy during a portion of the machine-accelerating period for partially energizing the machine, means for employing said auxiliary source to supplement the field excitation of the machine during said portion of the accelerating period, means for employing the supply-circuit energy alone during the remainder of said period, and means for employing said auxiliary source to gradually increase the main field winding excitation as the main-machine speed decreases during the regenerative period.

12. In a regenerative system of control, the combination with a plurality of momentum-driven dynamo-electric machines severally having armatures and field-magnet windings, and a supply circuit therefor, of means for effecting uninterrupted parallel-series transition of said machines, said means including resistance temporarily introduced directly between the machines.

13. In a regenerative system of control, the combination with a plurality of momentum-driven dynamo-electric machines severally having armatures and field-magnet windings, and a supply circuit therefor, of a plurality of variable translating devices connected in circuit with the respective armatures, means for gradually short-circuiting the translating devices as the machine speed decreases, and means for effecting uninterrupted parallel-series transition of said machines, said last means including means for initially inserting predetermined portions of said translating devices directly between the machine armatures.

14. In a system of regenerative control, the combination with a plurality of dynamo-electric machines, of means for effecting parallel-series transition thereof, and means located in the machine circuits for limiting the current during such transition.

15. In a system of regenerative control, the combination with a plurality of dynamo-electric machines, of means for effecting parallel-series transition thereof, said means including current-limiting means connected intermediate said machines under predetermined conditions, means for opening the parallel connections of said machines, and means for then varying the active value of said current-limiting means.

16. In a system of regenerative control, the combination with a plurality of dynamo-electric machines, of means for effecting parallel-series transition thereof, said means including a resistor inserted in circuit intermediate said machines, means for subsequently opening the parallel connections of the machines, and means for then excluding said resistor from circuit.

17. In a system of regenerative control, the combination with a supply circuit, and a plurality of dynamo-electric machines, of means for initially effecting parallel regeneration of said machines, a plurality of main-circuit resistors, means for effecting parallel-series transition of said machines, said means comprising means for inserting certain portions of said resistors in circuit intermediate said machines to inaugurate such transition, means for disconnecting the respective machines from opposite supply-circuit conductors, and means for short-circuiting said resistor portions.

18. The method of effecting transition of a plurality of dynamo-electric machines from parallel to series relation thereof that consists in connecting a translating device intermediate said machines, opening the parallel connections of the machines, and varying the active value of said translating device.

19. The method of effecting transition of a plurality of momentum-driven dynamo-electric machines from parallel to series-relation thereof that consists in inserting certain portions of a plurality of resistors in circuit intermediate said machines, disconnecting the machines from the respective supply-circuit conductors, and decreasing the active portions of said resistors.

In testimony whereof, I have hereunto subscribed my name this 31st day of Aug. 1915.

RUDOLF E. HELLMUND.